UNITED STATES PATENT OFFICE 2,547,722

ANIMAL REPELLENT COMPOSITIONS COMPRISING THIOCYANIC ACID SALTS OF PRIMARY AND SECONDARY METHYLIDENE AMINES

Floyd D. Stewart, Akron, Ohio, assignor to The B. F. Goodrich Company, New York, N. Y., a corporation of New York No Drawing. Application November 15, 1947, Serial No. 786,330

4 Claims. (Cl. 167—22)

This invention relates to new chemical compounds and to a method of preparing them, and more specifically pertains to thiocyanic acid salts of primary and secondary methylidene amines.

It is known that the reaction of an aryl amine or its hydrochloride with ammonium thiocyanate produces a monosubstituted thiourea according to the following equation, where aniline is employed as a typical aryl amine:

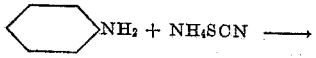

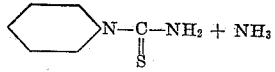

I have discovered, however, that the formation of a monosubstituted thiourea does not occur when ammonium thiocyanate is reacted with amines other than aryl amines; that primary and secondary amines of the type referred to herein as "methylidene" amines because the carbon to which the amine function is attached is present in the methylidene

group, react with ammonium thiocyanate to yield an amine salt of thiocyanic acid instead of the expected monosubstituted thiourea. This reaction with primary and secondary methylidene amines is illustrated by the following equations wherein R is hydrogen or an organic residue:

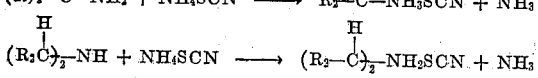

The fact that the products obtained with such amines are thiocyanic acid salts rather than substituted thiourea is shown by a number of identification tests. The products are very soluble in water and alcohol whereas the monosubstituted thioureas are only slightly soluble; they give negative results in the ammoniacal silver nitrate test for thioureas; they do not form picrates as will the monosubstituted thioureas; they are neutral whereas the monosubstituted thioureas are alkaline; they give a positive test for thiocyanate ion with ferric chloride; they decompose to liberate amine when heated in presence of alkali and they have melting points lower than the melting points of the corresponding monosubstituted thioureas.

According to this invention thiocyanic acid salts are formed in excellent yield and without formation of substituted thioureas when ammonium thiocyanate is reacted with an amine having at least one hydrogen atom connected to an amino nitrogen atom (i. e., a primary or secondary amine) and also having at least one hydrogen atom connected to each carbon atom attached to an amino group (i. e., a methylidene amine). The amine used may be aliphatic or alicyclic or it may have its amino nitrogen atom as a part of a heterocyclic ring, provided of course that hydrogen is attached to the amino nitrogen and to the carbon adjacent thereto. Moreover more than one primary or secondary amino group may be present as in the alkylene di- and polyamines. Preferably, the amine is one which contains carbon, hydrogen and amino nitrogen atoms only, or which contains, in addition to these atoms no atoms other than oxy oxygen atoms, that is, oxygen atoms present in oxy groups.

More specifically, the amines which can be employed according to this invention include such mono- and di-alkyl amines as methylamine, dimethylamine, ethylamine, diethylamine, isopropylamine, ethanolamine, n-butylamine, isobutylamine, di-n-butylamine, diisobutylamine, diisopropylamine, n-amylamine, n-hexylamine, di-n-octylamine, n-dodecylamine and the like; such alicyclic amines as cyclopentyl and cyclohexylamine and the like; heterocyclic amines containing the grouping

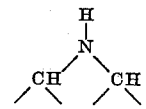

in a ring structure such as ethylene imine, piperidine, piperazine, pipecolines, morpholine, and the like; and such alkylene di- and polyamines as ethylene diamine, diethylene triamine, 1,2-propanediamine, 1,3-propanediamine, 1,8-octanediamine, triethylenetetramine, heptaethyleneoctamine, and the like; as well as various other amines, which are not chemically saturated as are those previously named but which do have hydrogen connected to the amino nitrogen and to the carbon adjacent thereto, including such aliphatic unsaturated amines as allyl and diallyl amines and such aralkyl amines as benzylamine and dibenzylamine.

The following specific examples illustrate the preparation of my new amine thiocyanates. In each of the examples below the term "parts" indicates the parts by weight.

EXAMPLE I

To 15.2 parts of ammonium thiocyanate in a reaction vessel there were added 14.6 parts of n-butylamine. There was a slight increase in the temperature of the reaction mixture accompanied by the evolution of ammonia. The reaction mixture was heated to 90° C. and maintained at about 90° C. for 60 minutes. The reactor was evacuated for about 10 minutes to remove the ammonia formed during the reaction. The remaining product was identified as n-butylamine thiocyanate, an oil which has an index of refractivity of 1.517 and was recovered in a 96% yield.

EXAMPLE II

Isopropylamine, 106 parts, and ammonium thiocyanate, 91.2 parts, were placed in a reactor and heated to 90° C. for 60 minutes. During the reaction copious amounts of ammonia were given off. The reactor was evacuated to about 10 m. m. Hg to remove the remaining ammonia formed during the reaction. The product, isopropylamine thiocyanate, a white crystalline material had a melting point of 83° C. after purification by recrystallization. The purified material was analyzed for its chemical composition and the following percentage composition was found which compares quite favorably to the calculated composition for isopropylamine thiocyanate, $C_3H_7NH_2SCN$:

|   | Per cent Composition by Analysis |   | Per cent Composition Calculated |
|---|---|---|---|
| H | 8.55 | H | 8.54 |
| C | 40.68 | C | 40.67 |
| N | 23.84 | N | 23.73 |
| S | 27.17 | S | 27.06 |
|   | 100.24 |   | 100.00 |

EXAMPLE III

To 30.4 parts of ammonium thiocyanate there were added 42.8 parts of benzylamine. The temperature of the mixture rose from room temperature to 45° C. and some ammonia was given off. The mixture was heated to 90° C. and maintained at that temperature for 60 minutes while copious quantities of ammonia were liberated. The remaining ammonia was removed as before. The product, identified as benzylamine thiocyanate, was a white needle-like crystalline material which when purified by recrystallization three times had a melting point of 95–96° C. The yield of this product was 100% of the theoretical.

EXAMPLE IV

To 29.5 parts of dibenzylamine there were added 11.4 parts of ammonium thiocyanate. The reaction mixture was then heated to 100° C. and maintained at that temperature for 60 minutes. The remaining ammonia was removed as before. The product was a white crystalline material having a melting point of 158–159° C. after purification by three successive recrystallizations, and was recovered in a 99% yield. It was identified as dibenzylamine thiocyanate.

EXAMPLE V

To 38.0 parts of ammonium thiocyanate there were added 64.5 parts of dibutylamine. There was a spontaneous increase in temperature from room temperature to 35° C. accompanied by the evolution of ammonia. The reacting mixture was heated for 60 minutes at 55° C. and more ammonia came off. The remaining ammonia was removed as before. The resulting product, identified as dibutylamine thiocyanate, was an oily material which had a refractive index of 1.498 (D scale at 20° C.) and had a boiling point of 131° C. at 0.2 m. m. Hg.

EXAMPLE VI

Diethylene triamine, 20.2 parts, when reacted with 15.2 parts of ammonium thiocyanate produced 31 parts, a 97% yield, of diethylene triamine thiocyanate, a viscous oily straw-colored liquid.

EXAMPLE VII

When 15.2 parts of ammonium thiocyanate and 20 parts of monocyclohexylamine were mixed there was a spontaneous rise in temperature from room temperature to 45° C. accompanied by the evolution of ammonia. The reacting mixture was heated to about 50° C. for 60 minutes and then subjected to a vacuum of about 10. m. m. Hg to remove the ammonia formed during the reaction. The resulting product, identified as cyclohexylamine thiocyanate, was a white crystalline material having a melting point of 99–100° C. after being washed with benzene. The yield calculated after the benzene wash was 92%. A 5 to 6% loss attributed to the benzene wash, would make the yield about 98%.

When monocyclohexylamine is replaced by other cycloalkyl amines such as cyclobutyl amine, cyclopentyl amine etc. other thiocyanic acid salts of cycloalkyl amines are obtained in excellent yield.

EXAMPLE VIII

Equal molecular portions of ammonium thiocyanate and piperidine were reacted at 90° C. The reaction was accompanied by the evolution of ammonia. The product, piperidine thiocyanate a white crystalline material, was recovered in a 97% yield and had a melting point of 93–94° C.

EXAMPLE IX

The reaction of equimolecular portions of morpholine and ammonium thiocyanate at 80° C. accompanied by the evolution of ammonia produced a 98% yield of morpholine thiocyanate a white crystalline material having a melting point of 119–121° C.

EXAMPLE X

The reaction of equimolar portions of ethylene diamine and ammonium thiocyanate at 90° C. accompanied by the evolution of ammonia produced a 100% yield of ethylene diamine thiocyanate a viscous brown oil which had an index of refractivity of 1.579. The formula for this product is believed to be: $H_2NCH_2CH_2NH_3SCN$. Other alkylene diamines of the formula $NH_2(CH_2)_xNH_2$ where $x$ is a numeral from 2 to 8 may be substituted for ethylene diamine to give similar thiocyanic acid salts.

The reaction temperatures given in the above examples are not critical, and may be varied widely. In many instances, as indicated above, the reaction takes place spontaneously merely on mixing of the reactants at room temperature. Heating the reacting mixture is desirable to aid in the removal of the ammonia formed during the reaction, but, as this may be accomplished by other methods, it is not a critical reaction condition. The use of reaction temperatures in the range of 25 to 100° C., however, is preferred. It is also preferable to agitate the reactants during the reaction in order to insure efficient contact throughout the reaction mass.

Any of the amines defined above may be reacted with ammonium thiocyanate to form the corresponding amine thiocyanate. Where the amine contains more than one primary or secondary amino group, it is possible to react the amine with more than one equivalent of ammonium thiocyanate and thus produce di-, tri- and polythiocyanate salts.

The amine thiocyanates obtained in the reaction described may be used for many purposes. For example, they can be employed as animal repellents to protect stored foodstuffs, orchard stock, truck gardens, and the like from destruction by depredating animals such as rats, mice and deer, or they may be used as insecticides, fungicides, etc.; or they may be employed as intermediate reactants in the synthesis of other chemical compounds.

The animal repellent properties of these amine thiocyanates are especially noteworthy for such animals as rats, mice, rabbits, woodchucks, deer, and other depredating animals cause considerable damage each year. The U. S. Department of Interior, Division of Predator and Rodent Control, has reported that rats alone cause two dollars damage for each person in the country even after forty years of effort in attempting to reduce the rat population. Also, a colony of pine mice (*Pitymys sp.*) or orchard mice (*Microtus sp.*) of only five to ten mice can in one winter girdle and destroy a fruit tree worth several hundred dollars. Rabbits, woodchucks and porcupines also cause considerable destruction to nursery stock and truck garden crops each year. As a result, chemical compounds which may be easily and economically applied to protect plants, trees, shrubs and stored and packaged goods from destruction by such animals are in great need. The compounds of this invention are quite useful in supplying this need.

These amine thiocyanates are especially effective repellents for wild rats, mice, rabbits and deer, for it has been found that when they are incorporated with the favorite foods of such animals in concentrations as low as 4% by weight, the animals will be discouraged from feeding. In fact, rats and mice confined to their cages with food so treated will consume less than 5% by weight of the food and will even refuse to consume substantial quantities of the treated food until death by starvation is imminent.

The following examples of laboratory and field tests demonstrate the efficiency of these amine thiocyanates as rodent and deer repellents.

LABORATORY TESTS

EXAMPLE XI

Standard food concentrate pellets one-half inch in diameter and five-eighths inch in length, each weighing 3.5 grams, were ground and a quantity of the repellent composition was added to give the desired concentration. Water and ethyl alcohol were added to the treated food mixture to form a dough-like paste which was extruded to reform pellets of the same size and shape as the original pellets. The newly formed pellets were thoroughly dried. This procedure was followed to prepare a treated food which would simulate the food fed to the rats in their daily diet. These dried treated pellets were then placed in cages containing rats of the Sherman strain which had had no food offered to them for the previous 24 hours. The effectiveness of the compounds as repellents is illustrated by the results disclosed in Table I. These results are the average for several replicates where each test involved a single rat in its own cage, and each rat was given 10 pellets for a three day ration. The results in Table I are typical for the class of compounds of this invention.

Table I

FOOD CONCENTRATE PELLETS CONTAINING AN AMINE THIOCYANATE

| Material Employed as a Repellent | Concentration in percent | Index of Repellency, Expressed as percent consumed |
|---|---|---|
| Propylamine thiocyanate | 10 | 5 |
| Cyclohexylamine thiocyanate | 10 | 5 |
| Diethylenetriamine thiocyanate | 10 | 5 |

In the field the repellents were used against rats and mice in orchards, barns, grain storage bins, warehouses where packaged foodstuffs were stored, market places, etc. with the results shown in the following examples. While these examples demonstrate the results obtained by the use of three specific compounds, other compounds of the class of amine thiocyanates may be employed with substantially equivalent results.

FIELD TESTS

EXAMPLE XII

Packages containing individual servings of prepared ready-to-eat cereals were coated with a composition containing paraffin wax and 10% by weight of an amine thiocyanate. Propylamine thiocyanate or cyclohexylamine thiocyanate or diethylene triamine thiocyanate was the specific material used. These packages were distributed together with untreated packages in places having a large rat and mouse population. The packages were left undisturbed from November to January. In January the boxes were collected and observed. Without exception all untreated packages had been torn open and a major part or all of the contents had been consumed, but the treated packages had at the worst only slight damage to the outer moisture resistant cover and most packages merely had tooth marks in the outer covers.

EXAMPLE XIII

Cedar browse was treated with cyclohexylamine thiocyanate and hung together with untreated cedar browse in deer feeding stations in a game reserve populated with deer. The feeding stations were inspected periodically. At one station 24 ounces of cedar browse treated with 1.0 ounce of cyclohexylamine thiocyanate (applied to the cedar browse by means of a 25% alcohol solution) were hung with 31 ounces of untreated cedar browse for 7 days, after which it was discovered that the treated browse had lost only 1.0 ounce in weight while the untreated browse had lost 22 ounces in weight as the result of deer feeding. At another station where 48 ounces of cedar browse treated with 2.0 ounces of cyclohexylamine thiocyanate were hung with 38 ounces of untreated cedar browse, it was discovered that after 24 hours the untreated cedar browse had lost 20 ounces in weight while the treated cedar browse lost only 8 ounces. The treated browse, now weighing 40 ounces, was rehung with 44 ounces of untreated cedar browse in the same feeding station, and 24 hours later the untreated browse had lost 24 ounces but the treated browse had lost only 2 ounces. The treated browse now weighing 38 ounces was rehung with 36 ounces of untreated browse in the same station and after 24 hours the untreated lost 17 ounces while the treated had no loss at all. Again the treated was rehung with untreated browse 30 ounces in weight and after 24 hours the treated lost 1.0 ounce while the untreated lost 19 ounces. Thus, in five days at a single station 78 ounces of untreated cedar browse was consumed while only 11 ounces of treated browse was consumed.

Bunches of cedar browse treated with propylamine thiocyanate or with diethylene triamine thiocyanate were also hung in deer feeding stations. These materials also reduced the feeding to a negligible amount. In general, any amine thiocyanate may be employed with substantially equivalent results.

My new compounds may also be employed in other pesticidal applications. Since they are quite soluble in water, pest-combatting compositions are easily prepared merely by adding water either with or without a wetting or dispersing agent. Dry powdery pesticidal compositions may also be prepared by admixing the amine thiocyanate with such powdery materials as clay, talc, diatomaceous earth, etc.

While I have disclosed specific examples of the preparation and utility of specific compounds of my invention, I do not thereby desire or intend to limit myself solely thereto, for as hitherto stated the conditions of the reactions and the precise proportions of the materials utilized may be varied and other amines of the class described may be employed as reactants without departing from the spirit and scope of the invention as defined in the appended claims.

I claim:

1. A composition for repelling rodents and other depredating animals which comprises as the essential active ingredient a thiocyanic acid salt of a methylidene amine and as a carrier therefor an aqueous solution of a dispersing agent.

2. A composition for repelling rodents and other depredating animals which comprises as the essential active ingredient cyclohexylamine thiocyanate and as a carrier therefor an aqueous solution of a dispersing agent.

3. A composition for repelling rodents and other depredating animals which comprises as the essential active ingredient propylamine thiocyanate and as a carrier therefor an aqueous solution of a dispersing agent.

4. A composition for repelling rodents and other depredating animals which comprises as the essential active ingredient diethylene triamine thiocyanate and as a carrier therefor an aqueous solution of a dispersing agent.

FLOYD D. STEWART.

REFERENCES CITED

The following references are of record in the file of this patent:

UNITED STATES PATENTS

| Number | Name | Date |
| --- | --- | --- |
| 2,024,098 | Heckert | Dec. 10, 1935 |
| 2,077,479 | Hollander | Apr. 20, 1937 |
| 2,203,919 | Murphy | June 11, 1940 |
| 2,222,638 | Szillard | Nov. 26, 1940 |
| 2,362,890 | Dietrich | Nov. 14, 1944 |
| 2,376,796 | Mathes | May 22, 1945 |
| 2,390,848 | Richter | Dec. 11, 1946 |

FOREIGN PATENTS

| Number | Country | Date |
| --- | --- | --- |
| 495,892 | Great Britain | of 1938 |

OTHER REFERENCES

J. Am. Pharm. Assn., Nov. 1947, vol. 36, pp. 349–352. (Copy in Patent Off. Library.)